Patented Mar. 24, 1953

2,632,773

UNITED STATES PATENT OFFICE 2,632,773

MANUFACTURE OF PEROXIDIC COMPOUNDS

Godfrey Paul Armstrong, Kingswood, Reginald Harold Hall, Sutton, Denis Cheselden Quin, Teddington, and Karl Heinrich Walter Turck, Banstead, England, assignors, by mesne assignments, to Hercules Powder Company, a corporation of Delaware No Drawing. Application March 11, 1952, Serial No. 276,052. In Great Britain April 1, 1947

7 Claims. (Cl. 260—610)

The present invention relates to improvements in and a process for the production of peroxides from isopropyl benzene. By the expression "Peroxides" is meant the peroxide as well as the hydroperoxide.

The preparation of isopropyl benzene peroxide from isopropyl benzene has been described by Hock and Lang in Berichte (1944) vol. 77, page 257. They proceeded by shaking the said hydrocarbon with dry oxygen with concurrent exposure to shortwave irradiation. In this way they succeeded in converting into the corresponding hydroperoxide not more than 24 grams out of 360 grams of isopropyl benzene treated within 24 hours, that is, 2.4 grams per hour per litre or an overall rate of approximately 0.3% by weight per hour. It is evident that such a process cannot form the basis for large scale production. A technically feasible process on the other hand becomes of primary importance since the said peroxidic compounds may form intermediates for the economical preparation of phenolic compounds.

It has been found, furthermore, that when liquid hydrocarbons of the kind indicated above are subjected to an oxidation treatment by bringing them into intimate contact with molecular oxygen the oxidation proceeds extremely slowly for a considerable time at the start, and during this induction period the rate of oxygen absorption increases only gradually. The addition of certain catalysts such as copper may overcome this difficulty but generally leads to a considerably lower efficiency as regards the production of peroxidic compounds and frequently results in the production of large amounts of carbon dioxide by complete combustion of the starting material.

It is an object of this invention to provide a process which makes the commercial production of peroxidic compounds from isopropyl benzene possible. It is another object of the invention to reduce the induction period for the oxidation reaction to a minimum and thus increase the overall yield of the peroxidic compounds over a certain time.

According to the present invention isopropyl benzene peroxide is produced by bringing isopropyl benzene in the liquid phase, in the absence of heavy metal oxidation catalysts, into intimate contact with molecular oxygen at temperatures between 70° and 150° C. and adding to the reaction mixture fresh isopropyl benzene continuously or intermittently whilst the oxidation reaction proceeds.

Preferably the addition of the fresh isopropyl benzene to the reaction mixture is started after the rate of oxidation in the said mixture has become practically constant. A preferred method of carrying out the process in practice consists in withdrawing an amount of the reaction mixture corresponding to and commensurate with the quantity of fresh isopropyl benzene added thereto, so that the volume of the reaction mixture in the reactor remains constant.

By introducing fresh isopropyl benzene to the reaction mixture in operation the rate of oxidation per unit volume is not decreased as was to be expected judging from the fact that with the fresh isopropyl benzene fresh material which had been inhibiting or retarding the oxidation at the start is continuously added to the reaction mixture. It is, therefore, surprising that in spite of the continuous addition of the fresh isopropyl benzene according to the invention a high rate of oxidation of the starting material per unit volume is maintained.

The molecular oxygen for the oxidation may be in the form of practically pure oxygen, of gases rich in oxygen, such as commercial oxygen or in the form of gas mixtures containing oxygen, such as air. The use of super-atmospheric pressure is advantageous.

The presence of ozone in the gases containing oxygen has also proved to be advantageous. The use of short wave irradiation is not necessary for carrying out the process of the invention, but may be advantageous in some cases.

Furthermore, Hock and Lang (loc. cit.) have stated that in the case of isopropyl benzene decomposition of the peroxide formed does not begin below a temperature of from 165°–170° C. We have found, however, that a certain decomposition of the per-compounds occurs during the oxidation which affects adversely the yields of per-compounds produced, even when the temperatures during the oxidation operation are kept below said temperatures. This decomposition depends apparently on the concentration of the peroxidic compounds present in the reaction mixture. It is, therefore, a further object of this invention to reduce this decomposition and keep it at a minimum. This is achieved by feeding fresh isopropyl benzene to the reaction mixture and withdrawing the commensurate amount of the latter at such a rate that the amount fed in is more than twice, preferably more than three to four times, the amount which under prevailing conditions is oxidised during the same time, so that the peroxide concentration in the reaction mixture does not exceed 50% and is preferably less than 25%. The residence time of the reaction mixture in the reactor is therefore comparatively short whereby the decomposition of the peroxide already formed in the mixture is minimised.

It is advantageous to provide for the presence in the reaction mixture of small amounts of alkali. These amounts are preferably at least sufficient to neutralise any carboxylic acids which are present or may be formed during the reaction. A small excess of alkali in the reaction mixture will not disadvantageously influence the oxidation reaction.

As alkali may be used the carbonates, bicarbonates, or hydroxides of alkali metals, such as sodium and potassium hydroxide, sodium carbonate, sodium bicarbonate, and potassium carbonate, also the oxides or hydroxides of alkaline earths such as calcium and barium, the normal phosphates of the said metals, ammonia and the like. It has been found convenient to add for instance the hydroxides in the form of a concentrated aqueous solution, whereby a good dispersion of the alkali in the reaction mixture is assured.

By the term "liquid phase" it is to be understood that the medium into which the gas containing molecular oxygen is introduced is liquid at the reaction temperature. In the process of this invention the liquid phase is homogeneous. When introducing the oxygen or oxygen containing gases into isopropyl benzene in the homogeneous liquid phase, the most favourable temperatures, within the above mentioned range of 70° to 150° C. are between 115° and 150° C. and especially 120° to 140° C. It has been found moreover that in spite of these elevated temperatures the primarily formed peroxide does not at first decompose excessively, but as time goes on this decomposition tends to become autocatalytic. This acceleration of the decomposition in consequence of the autocatalytic effect occurs when the efficiency as hereinafter defined drops to 80% and less. It is therefore a special feature of the invention when oxidizing the isopropyl benzene in the homogeneous liquid phase to limit the time of reaction and of residence in the reaction zone so that the efficiency of the process does not fall below 80%.

By "efficiency" is meant here the proportion of moles of peroxide in the reaction mixture to the number of moles of oxygen absorbed by 100 moles of isopropyl benzene initially present. The proportion of peroxide in the reaction mixture, i. e., its concentration per 100 moles of isopropyl benzene initially present is determined by the withdrawal of samples of the reaction mixture followed by iodometric titration of the peroxide content therein.

It is therefore possible to obtain a high rate of hourly output of peroxide provided that the time of oxidation is restricted.

The following Tables 1A and 1B refer to batch experiments and show that the efficiency has initially a high value, and that this decreases as the oxidation reaction proceeds; the rate of decrease of the efficiency is at first slow but later becomes considerably more rapid beyond the point where the peroxide concentration is at a maximum and the efficiency about 80%.

TABLE 1A

At 120° C.

| Time Hours | Rate | Peroxide Concentration | Efficiency |
|---|---|---|---|
| 1 | 0.2 | | |
| 2 | 1.0 | 1 | |
| 3 | 2.1 | 2.5 | 97 |
| 4 | 3.6 | 6 | 96 |
| 5 | 5.4 | 10 | 95 |
| 6 | 8.2 | 17 | 93 |
| 7 | 9.0 | 24 | 90 |
| 8 | 7.8 | 31 | 89 |
| 9 | 6.0 | 34 | 84 |
| 10 | 3.9 | 34 | 77 |
| 11 | 2.3 | 32 | 68 |

TABLE 1B

At 130° C.

| Time Hours | Rate | Peroxide Concentration | Efficiency |
|---|---|---|---|
| 1 | 1.4 | 1 | 100 |
| 2 | 5.2 | 6.5 | 98 |
| 3 | 9.0 | 13.5 | 94 |
| 4 | 13.2 | 21 | 89 |
| 5 | 10.0 | 30 | 82 |
| 6 | 7.0 | 31 | 73 |
| 7 | 4.8 | 25 | 56 |

The term "rate" is used to express the moles of oxygen absorbed per hour, and the term "peroxide concentration" the moles of peroxide present, in both cases per 100 moles of isopropyl benzene initially present.

The present invention therefore comprises keeping the oxidation reaction within such limits that the decrease in efficiency does not become accelerated, i. e., such that the efficiency does not fall below 80%. Since the decomposition of the peroxide proceeds, moreover, under the influence of the high temperature the residence time of the reaction mixture in the reaction zone should be as short as possible. It is therefore preferred to remove the reaction mixture from the reaction zone as soon as or before the oxidation reaction reaches those limits and preferably to cool it so that further decomposition is prevented. As on the other hand the oxidation proceeds at a very much higher rate when the temperature is near the upper limit, it is a further feature of this invention to carry out the oxidation at the start at the higher temperature, i. e., at about 140° to 150° C. and then to reduce the temperature in the reaction mixture and proceed with the oxidation at about 115° to 125° C.

The figures given in the Tables 1A and 1B were obtained by tests carried out in a batchwise manner.

The second columns of the above Tables 1A and 1B, show that the rate of oxygen absorption rises in each run until it reaches a maximum. At 120° C. this maximum rate of absorption is attained after about 7 hours, and at 130° C. after about four hours. Thereafter it falls fairly rapidly until the rate of oxygen absorption has dropped to approximately one third to one quarter of the maximum rate during the last hour indicated in the tables. The efficiency, as can be seen, remains high, that is about 90% and more, whilst the oxygen absorption rate rises and the peroxide concentration increases. It is therefore a preferable feature of this invention to stop the introduction of oxygen into the reaction mixture whilst the rate of oxygen absorption is still increasing. In this manner the best use is made of the oxygen introduced into the reaction mixture and of the isopropyl benzene, before the decomposition of the peroxide formed leads to any substantial extent to the formation of undesired by-products.

The method, by which the residence time required to maintain any desired conditions in a continuous process may be calculated approximately from results obtained in a batch process carried out under similar temperature conditions, is illustrated in Table 2 below. The desired condition to be maintained in a continuous process is here for instance a peroxide concentration of 8%, and the figures given for the rate and efficiency are those obtained in a batch process at the temperature indicated when the peroxide concentration reaches this figure. The residence time is then calculated using the expression:

$$\text{Residence time} = \frac{\text{peroxide concentration} \times 100}{\text{rate} \times \text{efficiency}}$$

The terms "peroxide concentration" and "rate" have here the same meaning as hereinbefore defined. The term "efficiency" here used is the proportion of moles of peroxide produced to moles of oxygen absorbed by 100 moles of isopropyl benzene over a short period (e. g. 1 hour) which is chosen to correspond to the time at which the other quantities are recorded.

TABLE 2

| Temperature, °C. | Peroxide Concentration, Percent | Rate, Moles Percent/Hr. | Efficiency, Percent | Calculated Residence, Time Required, Hours |
|---|---|---|---|---|
| 85 | 8 | 0.6 | 65 | 20.5 |
| 110 | 8 | 1.7 | 94 | 5.0 |
| 120 | 8 | 4.5 | 96 | 1.8 |
| 130 | 8 | 6.4 | 97 | 1.3 |
| 140 | 8 | 17.0 | 91 | 0.5 |

The alkaline substances which are to neutralise the carboxylic acids present or formed during the reaction may be added in the form of a concentrated aqueous solution of water-soluble alkaline compounds such as alkali metal hydroxides. They also may be added as solids, preferably in finely-divided form.

The quantity of alkali added is with advantage adjusted in such a way that when a filtered sample of the reaction mixture is extracted with about twice its volume of distilled water the pH value of the aqueous extract is not less than 4 when measured electrometrically. In the continuous process the alkaline substance is advantageously introduced into the system with the fresh isopropyl benzene. Apart from preventing the corrosion of iron vessels and the formation of soluble metal compounds the effect of the alkali addition is that the maximum rate of oxygen absorption is higher and is reached in a shorter time, and that the peroxide concentration in the reaction mixture is greater than in those obtained in the absence of alkali. In other respects such as the efficiency the course of the reaction in the presence of alkali is very similar to that which the process takes in the absence of the alkali. The alkaline substances are preferably added in the form of concentrated solutions, for instance of alkali metal hydroxides in order to facilitate their introduction and their uniform distribution. The amount of water in the solution is advantageously limited so that at the reaction temperature it is evaporated with great rapidity. At any rate, it should be so limited that substantially no heterogeneous liquid phase is formed in the reaction mixture.

The oxidation process in the homogeneous liquid phase may be carried out conveniently in a tower or similar apparatus, into one end of which the isopropyl benzene, preferably preheated or partly preoxidised is fed, whilst at the other end the isopropyl benzene peroxide containing the reaction product is withdrawn continuously or periodically in such a way that the concentration of peroxide within the tower or apparatus increases in the direction of the flow of the liquid. The dimensions of the tower and the volume of isopropyl benzene passed through said tower in the time unit, are adjusted so that the residence time in the said tower fulfills the features of this invention, namely, that the liquid reaction mixture leaves the tower before the efficiency drops below 80% or before the maximum rate of oxygen absorption thereby is attained.

It is also possible to carry out the process in a series of continuous reaction vessels, each of which works on a certain peroxide level. The fresh isopropyl benzene fed into the tower or the first of the series of reaction vessels contains preferably, some previously formed peroxide to initiate the oxidation reaction.

For carrying out the process of the present invention it is preferred to use isopropyl benzene for the oxidation which is free from unsaturated compounds such as styrenes and/or substances which act as catalysts for decomposition of the peroxide formed during the oxidation. Styrene and styrene compounds such as methyl styrene produce a deleterious effect upon the oxidation reaction even in such minute quantities as 50 parts per million (p. p. m.). Said compounds may be removed for instance by washing with sulphuric acid and/or alkali metal permanganate solution or by their conversion into separate compounds by hydrogenation for instance by means of Raney nickel. It is however possible to use in the process according to this invention commerical isopropyl benzene which has been purified by a single distillation only and to maintain the oxidation at a high rate as soon as it is once established. It is however, preferred to use isopropyl benzene which has been previously purified by the means described above as the efficiency of the oxidation reaction is better with purified isopropyl benzene than when isopropyl benzene is used which has not been purified. Substances which act as catalysts for the decomposition of the peroxide are for instance soluble compounds such as copper, cobalt, manganese and the like. It is however possible to carry out the oxidation in metal reactors which are not attached under the conditions of the reaction, such as for example mild steel in the presence of alkali.

The isopropyl benzene peroxide formed may be isolated from the reaction mixture in the well-known manner or may be subjected immediately to decomposition for the manufacture of acetone and phenol.

The following examples show the manner in which the process of the invention may be carried out in practice:

*Example 1*

Into a reactor fitted with an overflow and having a liquid capacity of 185 cc. were fed 370 cc. of purified isopropyl benzene per hour to which was added 0.05 cc. of a 50% sodium hydroxide solution every 10 hours. Through the overflow this vessel communicated with another vessel with an overflow volume of 700 cc. To the contents of this vessel was added 0.05 cc. of a 50% NaOH solution every 6 hours.

In the first reactor the temperature was maintained at 140° C. whilst oxygen of about 90% purity was introduced and absorbed at the rate of 9.2 mole per cent per hour. The residence time in this vessel was 30 minutes and the concentration of the peroxide produced in this vessel was 4.4 mole per cent. The temperature in the second vessel was kept at 130° C. The oxygen absorption in this vessel amounted to 11.4 mole per cent per hour and the produced peroxide amounted to 23 mole per cent concentration. The residence time in this vessel was 1 hour 53 minutes.

The efficiency in the first vessel was 96% whilst the efficiency in the second was 86%; the total oxygen absorbed by the contents of the two vessels per 100 moles of isopropyl benzene initially fed into the first vessel came to 26.1 moles and the total of peroxide formed to 22.9 moles, the efficiency over both stages thus being 88%.

Example 2

A reaction vessel equipped with a high speed agitator was charged with 150 cc. of purified isopropyl benzene to which 0.1 cc. of a 20% aqueous solution of sodium hydroxide had been added. The contents of the vessel were heated to 130° C. and oxygen of about 98% purity was introduced into the reactor. Absorption started within 15 minutes and the rate of absorption was 5.8 mole per cent in the first hour of which 100% was converted into peroxide. In the second hour the oxygen absorption was 17.4 mole per cent and the efficiency was 97%. The absorption of oxygen by the reaction mixture in the third hour was 20.6 mole per cent, whilst the efficiency dropped to 93%. The oxygen introduction was then stopped before the absorption rate reached its previously ascertained maximum.

Example 3

Isopropyl benzene was oxidised in a mild steel vessel of 2 gallons capacity, equipped with a stirrer, liquid overflow, reflux condenser and oxygen inlet line. The vessel was charged with isopropyl benzene purified by a single hydrogenation of a commercial product, and containing less than 40 p. p. m. of styrenes, and with 7 cc. of a 50% solution of sodium hydroxide. The temperature of the charge was raised to 130° C. and oxygen of 95% purity introduced. Absorption of oxygen started after a short time and after 0.5 hour had reached 9 mole per cent per hour; at this point continuous feeds of fresh isopropyl benzene (similar to that used for the initial charge) and of 50% sodium hydroxide solution were started, and a corresponding volume of the oxidation product removed from the vessel continuously by way of the overflow. Steady conditions were reached in less than 7 hours from the start of the run, the data for which are given below.

At a later stage of the run a feed of untreated commercial isopropyl benzene containing about 500 p. p. m. of alpha-methylstyrene was substituted for the hydrogenated material, and the conditions were adjusted so that the peroxide concentration in the product remained substantially constant. The figures for the steady conditions obtained are also given below.

| Feed Material | Hydrogenated Com'l Isopropyl Benzene | Untreated Com'l Isopropyl Benzene |
|---|---|---|
| Isopropyl benzene feed rate (litres per hour per litre volume of reaction liquid). | 0.62 | 0.54. |
| Alkali feed rate (cc. 50% NaOH per litre volume of reaction liquid). | 0.5 | 0.5. |
| Oxygen absorption rate (moles per hour per 100 moles of isopropyl benzene). | 21.7 l./hr./litre—13.5. | 20.9 l./hr./litre—14.2. |
| Peroxide make | 134 grams/hr./l. | 122 grams/hr./l. |
| Peroxide concentration in product (percent by weight). | 23.9 | 24.7. |
| Efficiency of peroxide production (percent on O$_2$ consumed). | 91 | 88. |

Example 4

A reaction vessel equipped with a high speed agitator was charged with 150 cc. of a purified isopropyl benzene to which had been added about 0.7 gram of sodium bicarbonate. The contents of the vessel were heated to 120° C., and oxygen of about 98% purity was passed through the reaction mixture, which was vigorously stirred. After 5.5 hours of oxidation the reaction mixture contained 20.6% peroxide by weight, and at this point additional isopropyl benzene was continuously fed to the reactor. Corresponding amounts of oxidation product were withdrawn through a take-off line. These conditions resulted in a constant rate of oxidation.

Example 5

Isopropyl benzene was oxidized in a stainless steel tower equipped with a reflux condenser, a liquid overflow, an inlet for liquid feed, and an air inlet in the base. The tower was charged with isopropyl benzene containing 0.7% by weight of sodium carbonate in suspension. The charge was heated to 110° C. and the apparatus pressure was raised to 100 p. s. i. g. with air. Air was then blown in at the base of the tower at a rate of 25–50 litres/hour/litre reactor volume until the product contained 20% by weight isopropyl benzene hydroperoxide. Fresh isopropyl benzene was then fed in at a rate (about 200 ml./hour/litre reactor volume) sufficient to maintain a peroxide content of about 20% by weight, and the air rate was increased to 50–60 litres/hour/litre reactor volume. The oxidation product was withdrawn continuously through the overflow in to a receiver.

Beginning with the introduction of fresh isopropyl benzene, the operation became continuous, and the described conditions were maintained for 4.5 hours. During this period, other prevailing conditions were as follows: liquid working volume, 2.0 litres; residence time, 5.0 hours; oxygen content of effluent gas, 11–12%; and rate of hydroperoxide production, 18.5 grams/hour/litre reactor volume. Analysis of the reaction product showed it to contain 20.1% by weight isopropyl benzene hydroperoxide, 1.1% dimethyl phenyl carbinol and 0.3% acetophenone, the amount of hydroperoxide being equivalent to the production of about 92 moles of isopropyl benzene hydroperoxide per 100 moles of isopropyl benzene consumed.

This application constitutes a continuation-in-part of our application for United States Letters Patent, Serial No. 15,954, filed March 19, 1948.

What we claim and desire to protect by Letters Patent is:

1. A process for the production of isopropyl benzene hydroperoxide which comprises contacting a reaction mixture consisting of isopropyl benzene and alkali in homogeneous liquid phase with a gas containing molecular oxygen at a temperature between 70° and 150° C., whereby oxidation of the isopropyl benzene to isopropyl benzene hydroperoxide takes place, adding fresh isopropyl benzene to the reaction mixture while the oxidation proceeds and adding alkali in an amount sufficient to neutralize any carboxylic acid formed during the oxidation.

2. A process for the production of isopropyl benzene hydroperoxide which comprises contacting a reaction mixture consisting of isopropyl benzene and alkali in homogeneous liquid phase with a gas containing molecular oxygen at a temperature between 115° and 150° C., whereby oxidation of the isopropyl benzene to isopropyl benzene hydroperoxide takes place, adding fresh isopropyl benzene to the reaction mixture while the oxidation proceeds and adding alkali sufficient in amount to maintain a pH of between 4 and 10.5 in the reaction mixture.

3. A process for the production of isopropyl benzene hydroperoxide according to claim 2, wherein the oxidation is started at a temperature between 135° and 150° C. and is continued at temperatures between 120° and 135° C. after appreciable amounts of hydroperoxide have been formed.

4. A process as claimed in claim 2, which comprises adjusting the oxidation of the reaction mixture in such a manner that the proportion of hydroperoxide concentration therein to the oxygen absorption per 100 moles of isopropyl benzene initially present does not fall below 80%.

5. A process as claimed in claim 2, which comprises carrying out the oxidation in a plurality of successive stages in each of which the hydroperoxide concentration is maintained at a substantially uniform level while the concentration increases stepwise from the preceding to the subsequent stage.

6. A process for the production of isopropyl benzene hydroperoxide which comprises contacting a reaction mixture consisting of isopropyl benzene and alkali in homogeneous liquid phase with a gas containing molecular oxygen at a temperature between 70° and 150° C., whereby oxidation of the isopropyl benzene to isopropyl benzene hydroperoxide takes place, adding fresh isopropyl benzene to the reaction mixture while the oxidation proceeds and withdrawing a commensurate amount of said mixture to keep the volume in the reaction zone constant, restricting the residence time of said mixture in said reaction zone in such a manner that the concentration of hydroperoxide in the reaction mixture is prevented from rising to the level at which the maximum rate of oxygen absorption occurs, and adding alkali sufficient in amount to maintain a pH of between 4 and 10.5 in the reaction mixture.

7. A process for the production of isopropyl benzene hydroperoxide which comprises contacting a reaction mixture consisting of isopropyl benzene and sodium hydroxide in homogeneous liquid phase with a gas containing molecular oxygen at a temperature between 70° and 150° C., whereby oxidation of the isopropyl benzene to isopropyl benzene hydroperoxide takes place, adding fresh isopropyl benzene to the reaction mixture while the oxidation proceeds and adding sodium hydroxide in an amount sufficient to neutralize any carboxylic acid formed during the oxidation.

GODFREY PAUL ARMSTRONG.
REGINALD HAROLD HALL.
DENIS CHESELDEN QUIN.
KARL HEINRICH WALTER TURCK.

REFERENCES CITED

The following references are of record in the file of this patent:

FOREIGN PATENTS

| Number | Country | Date |
| --- | --- | --- |
| 964,006 | France | Jan. 18, 1950 |